US012748409B2

(12) United States Patent
Sakata et al.

(10) Patent No.: US 12,748,409 B2
(45) Date of Patent: Sep. 29, 2026

(54) PRODUCTION LINE DESIGN APPARATUS, PRODUCTION LINE DESIGN SYSTEM, AND PRODUCTION LINE DESIGN METHOD

(71) Applicant: Hitachi, Ltd., Tokyo (JP)

(72) Inventors: Hiroyuki Sakata, Tokyo (JP); Daisuke Tsutsumi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 441 days.

(21) Appl. No.: 18/371,480

(22) Filed: Sep. 22, 2023

(65) Prior Publication Data

US 2024/0134364 A1 Apr. 25, 2024
US 2024/0231344 A9 Jul. 11, 2024

(30) Foreign Application Priority Data

Oct. 19, 2022 (JP) ................................ 2022-167610

(51) Int. Cl.
*G05B 19/418* (2006.01)

(52) U.S. Cl.
CPC . *G05B 19/41885* (2013.01); *G05B 19/41865* (2013.01); *G05B 2219/31343* (2013.01)

(58) Field of Classification Search
CPC ........ G05B 19/41885; G05B 19/41865; G05B 2219/31343
USPC .......................................................... 700/97
See application file for complete search history.

(56) References Cited

U.S. PATENT DOCUMENTS

| | | | | |
|---|---|---|---|---|
| 11,256,241 | B1 * | 2/2022 | Sobalvarro | G05B 19/41885 |
| 2003/0009363 | A1 * | 1/2003 | Miyoshi | G06Q 10/06375 705/7.11 |
| 2015/0105887 | A1 * | 4/2015 | Troy | G05B 19/41865 700/97 |
| 2021/0311464 | A1 * | 10/2021 | Kajita | G05B 19/41805 |
| 2022/0114299 | A1 * | 4/2022 | Ichimura | G06F 30/20 |
| 2023/0221706 | A1 * | 7/2023 | Nakano | G05B 19/4188 700/97 |
| 2024/0036561 | A1 * | 2/2024 | Nakano | G06F 30/10 |

FOREIGN PATENT DOCUMENTS

JP 2007-317079 A 12/2007

* cited by examiner

*Primary Examiner* — Jigneshkumar C Patel
(74) *Attorney, Agent, or Firm* — MATTINGLY & MALUR, PC

(57) ABSTRACT

A production line design apparatus includes: a storage unit that stores facility configuration information that defines a number configuration including at least one or more main facilities that perform a main work in a production line and at least one or more setup facilities that perform an auxiliary work of the main facility, and arrangement pattern definition information including one or more arrangement patterns that define a combination of a movement method of the setup facility that is adoptable and a relative positional relationship between the main facility that is adoptable and the setup facility; and a processor that executes layout candidate generation processing of generating layout information that satisfies the number configuration by combining the arrangement patterns using the facility configuration information and the arrangement pattern definition information.

12 Claims, 15 Drawing Sheets

FIG.2

FACILITY CONFIGURATION INFORMATION 151

| LINE ID (151a) | STATION ID (151b) | FACILITY LARGE CATEGORY (151c) | FACILITY NAME (151d) | PURCHASE PRICE [k¥] (151e) | OUTER LATERAL WIDTH [m] (151f) | OUTER VERTICAL WIDTH [m] (151g) | OUTER HEIGHT [m] (151h) |
|---|---|---|---|---|---|---|---|
| 1 | 1 | SETUP FACILITY | ROBOT A | 1500 | 1.5 | 1.5 | 1 |
| 1 | 1 | MAIN FACILITY | PROCESSING MACHINE A | 50000 | 3 | 2 | 1 |
| 1 | 1 | PERIPHERAL FACILITY | MATERIAL STOCKER A | 1000 | 2 | 1 | 0.5 |
| 1 | 2 | PERIPHERAL FACILITY | CONVEYOR C | 300 | 1 | 0.5 | 0.5 |
| 1 | 2 | SETUP FACILITY | ROBOT B | 1500 | 1.5 | 1.5 | 1 |
| 1 | 2 | MAIN FACILITY | PROCESSING MACHINE B | 24800 | 2 | 3 | 1 |
| 1 | 2 | MAIN FACILITY | PROCESSING MACHINE C | 24800 | 2 | 3 | 1 |
| 1 | 2 | MAIN FACILITY | PROCESSING MACHINE D | 24800 | 2 | 3 | 1 |
| 1 | 2 | PERIPHERAL FACILITY | PRODUCT STOCKER A | 1000 | 2 | 1 | 1 |

FIG.3

ARRANGEMENT PATTERN DEFINITION INFORMATION

152

| ARRANGEMENT PATTERN ID (152a) | MAIN FACILITY/SETUP FACILITY NUMBER RATIO (152b) | SETUP FACILITY MOVEMENT METHOD (152c) | MAIN FACILITY/SETUP FACILITY RELATIVE POSITION (152d) |
|---|---|---|---|
| 1 | 1 | FLOOR SURFACE FIXING | UPPER STAGE |
| 2 | 2 | FLOOR SURFACE FIXING | UPPER AND LOWER STAGES |
| 3 | 2 OR MORE | FLOOR SURFACE TRAVELING RAIL | UPPER STAGE/PARALLEL |
| 4 | 3 OR MORE | FLOOR SURFACE TRAVELING RAIL | UPPER AND LOWER STAGES/PARALLEL |

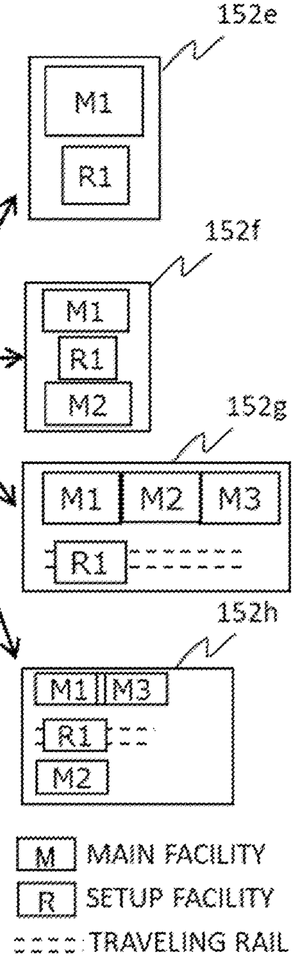

FIG.4

FACILITY CANDIDATE INFORMATION 153

| FACILITY ID (153a) | FACILITY LARGE CATEGORY (153b) | FACILITY NAME (153c) | RAIL LENGTH [m] (153d) | PURCHASE PRICE [k¥] (153e) | MOVEMENT SPEED [m/s] (153f) |
|---|---|---|---|---|---|
| 1 | PERIPHERAL FACILITY | FLOOR SURFACE TRAVELING RAIL A | 4.0 | 500 | 0.5 |
| 2 | PERIPHERAL FACILITY | FLOOR SURFACE TRAVELING RAIL B | 5.0 | 600 | 0.5 |
| 3 | PERIPHERAL FACILITY | FLOOR SURFACE TRAVELING RAIL C | 6.0 | 700 | 0.5 |
| 4 | PERIPHERAL FACILITY | FLOOR SURFACE FIXING TOOL A | 0 | 100 | 0 |
| 5 | PERIPHERAL FACILITY | FLOOR SURFACE FIXING TOOL B | 0 | 150 | 0 |
| ... | ... | ... | ... | ... | ... |

FIG.5

CONSTRAINT CONDITION INFORMATION

154

| CONSTRAINT ID | CONSTRAINT CONDITION ITEM | SET VALUE |
|---|---|---|
| 1 | CYCLE TIME UPPER LIMIT | 300 SEC |
| 2 | FLOOR SPACE VERTICAL WIDTH UPPER LIMIT | 6 m |
| 3 | FLOOR SPACE LATERAL WIDTH UPPER LIMIT | 14 m |
| ... | ... | ... |

154a 154b 154c

FIG.6

PROCESS ASSIGNMENT INFORMATION

155

| PRODUCT ID (155a) | PROCESS ID (155b) | PROCESS CONTENT (155c) | LINE ID (155d) | STATION ID (155e) | MAIN FACILITY (155f) | MAIN FACILITY WORK TIME(SEC) (155g) | SETUP FACILITY (155h) | SETUP FACILITY WORK TIME(SEC) (155j) |
|---|---|---|---|---|---|---|---|---|
| 1 | 1 | UPPER SURFACE ROUGH TURNING | 1 | 1 | PROCESSING MACHINE A | 120 | ROBOT A | 30 |
| 1 | 2 | LOWER SURFACE ROUGH TURNING | 1 | 1 | PROCESSING MACHINE A | 100 | ROBOT A | 30 |
| 1 | 3 | SIDE SURFACE ROUGH TURNING | 1 | 2 | PROCESSING MACHINE B | 150 | ROBOT B | 30 |
| 1 | 4 | UPPER SURFACE HOLE DRILLING | 1 | 2 | PROCESSING MACHINE C | 75 | ROBOT B | 100 |
| 1 | 5 | LOWER SURFACE HOLE DRILLING | 1 | 2 | PROCESSING MACHINE C | 75 | ROBOT B | 100 |
| 1 | 6 | UPPER SURFACE FINISH TURNING | 1 | 2 | PROCESSING MACHINE D | 100 | ROBOT B | 120 |

FIG.7

LAYOUT INFORMATION

156

| LINE ID (156a) | STATION ID (156b) | FACILITY NAME (156c) | CENTRAL X COORDINATE (m) (156d) | CENTRAL Y COORDINATE (m) (156e) | ROTATION AMOUNT (degree) (156f) | OUTER LATERAL WIDTH(m) (156g) | OUTER VERTICAL WIDTH(m) (156h) |
|---|---|---|---|---|---|---|---|
| 1 | 1 | ROBOT A | 2.25 | 1.25 | 0 | 1.5 | 1.5 |
| 1 | 1 | FLOOR SURFACE FIXING TOOL A | 2.25 | 1.25 | 0 | 1.5 | 1.5 |
| 1 | 1 | PROCESSING MACHINE A | 2.25 | 3.5 | 0 | 3 | 2 |
| 1 | 1 | MATERIAL STOCKER A | 0.5 | 1 | 90 | 2 | 1 |
| 1 | 2 | CONVEYOR C | 4 | 1.25 | 0 | 1 | 0.5 |
| 1 | 2 | ROBOT B | 5.75 | 1.25 | 0 | 1.5 | 1.5 |
| 1 | 2 | FLOOR SURFACE TRAVELING RAIL C | 8 | 1.25 | 0 | 6 | 1 |
| 1 | 2 | PROCESSING MACHINE B | 5.75 | 4 | 0 | 2 | 3 |
| 1 | 2 | PROCESSING MACHINE C | 8.0 | 4 | 0 | 2 | 3 |
| 1 | 2 | PROCESSING MACHINE D | 10.25 | 4 | 0 | 2 | 3 |
| 1 | 2 | PRODUCT STOCKER A | 13 | 1 | 90 | 2 | 1 |

FIG.8

LAYOUT EVALUATION INFORMATION

157

| LAYOUT CANDIDATE ID (157a) | CYCLE TIME[SEC] (157b) | FLOOR SPACE VERTICAL WIDTH[m] (157c) | FLOOR SPACE LATERAL WIDTH[m] (157d) | TOTAL INVESTMENT COST[M¥] (157e) |
|---|---|---|---|---|
| 1 | 300 | 6.0 | 15.0 | 50 |
| 2 | 282 | 5.5 | 13.5 | 60 |
| ... | ... | ... | ... | ... |

CANDIDATE LIST DISPLAY SCREEN

FIG.14

CANDIDATE DETAIL DISPLAY SCREEN

600

■CANDIDATE DETAIL DISPLAY

■LAYOUT CANDIDATE ID : 2

■ARRANGEMENT PATTERN COMBINATION : (1, 4)

▼ LAYOUT INFORMATION

610

| LINE ID | STATION ID | FACILITY NAME | CENTRAL X COORDINATE(m) | CENTRAL Y COORDINATE(m) | ROTATION AMOUNT (degree) | OUTER LATERAL WIDTH(m) | OUTER VERTICAL WIDTH(m) |
|---|---|---|---|---|---|---|---|
| 1 | 1 | ROBOT A | 2.25 | 1.25 | 0 | 1.5 | 1.5 |
| 1 | 1 | FLOOR SURFACE FIXING TOOL A | 2.25 | 1.25 | 0 | 1.5 | 1.5 |
| 1 | 1 | PROCESSING MACHINE A | 2.25 | 3.5 | 0 | 3 | 2 |
| 1 | 1 | MATERIAL STOCKER A | 0.5 | 1.0 | 90 | 2 | 1 |
| 1 | 2 | CONVEYOR C | 4.0 | 1.25 | 0 | 1 | 0.5 |
| 1 | 2 | ROBOT B | 5.75 | 1.25 | 0 | 1.5 | 1.5 |
| 1 | 2 | FLOOR SURFACE TRAVELING RAIL C | 8.0 | 1.25 | 0 | 6 | 1 |
| 1 | 2 | PROCESSING MACHINE B | 5.75 | 4.0 | 0 | 2 | 3 |
| 1 | 2 | PROCESSING MACHINE C | 8.0 | 4.0 | 0 | 2 | 3 |
| 1 | 2 | PROCESSING MACHINE D | 10.25 | 4.0 | 0 | 2 | 3 |
| 1 | 2 | PRODUCT STOCKER A | 13.0 | 1.0 | 90 | 2 | 1 |

▼ LAYOUT DIAGRAM

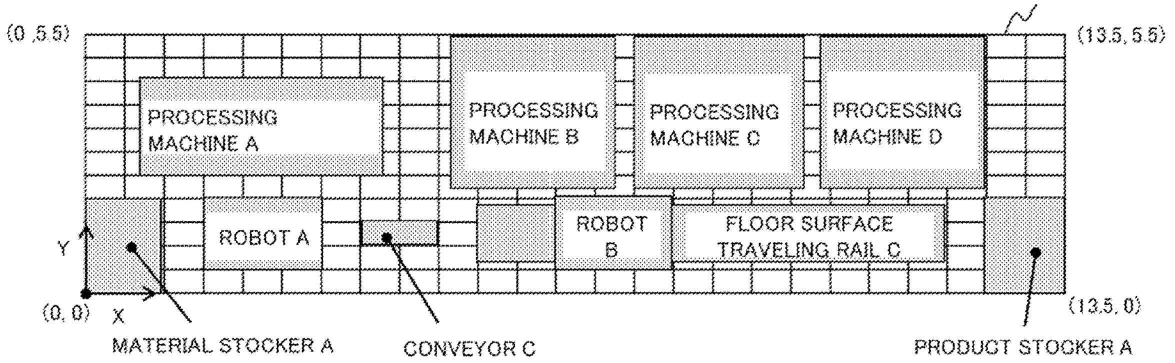

FIG.15

CYCLE TIME DISPLAY SCREEN

700

■CYCLE TIME DISPLAY

▼PROCESS ASSIGNMENT

710

| PRODUCT ID | PROCESS ID | PROCESS CONTENT | MAIN FACILITY | MAIN FACILITY WORK TIME | SETUP FACILITY | SETUP FACILITY WORK TIME | SETUP FACILITY MOVEMENT TIME |
|---|---|---|---|---|---|---|---|
| 1 | 1 | UPPER SURFACE ROUGH TURNING | PROCESSING MACHINE A | 120 | ROBOT A | 30 | 0 |
| 1 | 2 | LOWER SURFACE ROUGH TURNING | PROCESSING MACHINE A | 100 | ROBOT A | 30 | 0 |
| 1 | 3 | SIDE SURFACE ROUGH TURNING | PROCESSING MACHINE B | 150 | ROBOT B | 120 | 12 |
| 1 | 4 | UPPER SURFACE HOLE DRILLING | PROCESSING MACHINE C | 75 | ROBOT B | 120 | 12 |
| 1 | 5 | LOWER SURFACE HOLE DRILLING | PROCESSING MACHINE C | 75 | ROBOT B | 120 | 12 |
| 1 | 6 | UPPER SURFACE FINISH TURNING | PROCESSING MACHINE D | 100 | ROBOT B | 120 | 12 |

▼CYCLE TIME DETAILS

720

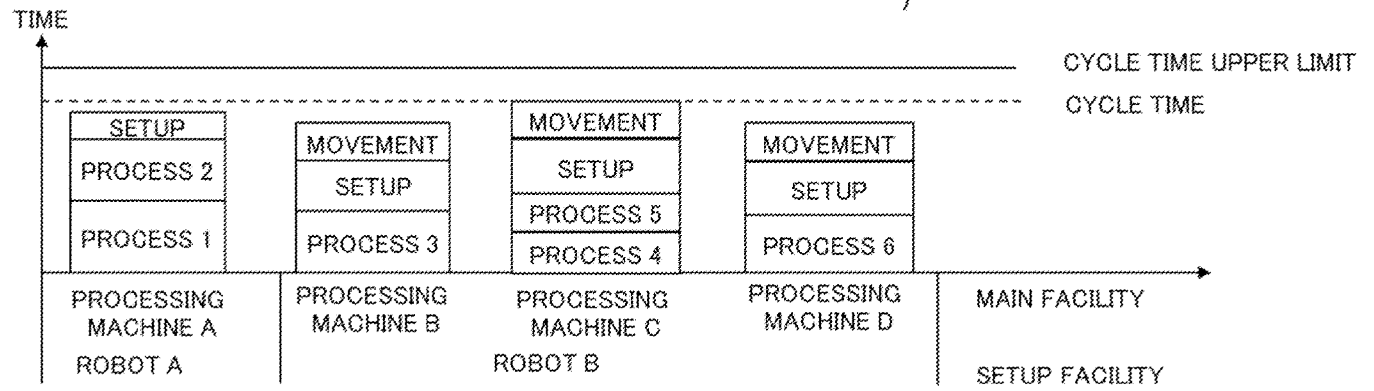

PRODUCTION LINE DESIGN APPARATUS, PRODUCTION LINE DESIGN SYSTEM, AND PRODUCTION LINE DESIGN METHOD

CROSS-REFERENCE TO RELATED APPLICATION

The present application claims priority from Japanese application JP2022-167610, filed on Oct. 19, 2022, the content of which is hereby incorporated by reference into this application.

BACKGROUND

Technical Field

The present invention relates to a production line design apparatus, a production line design system, and a production line design method.

Related Art

The introduction of a production line includes phases such as inquiry, design, hardware production, software creation, installation test, and delivery. Among them, in the design phase, it is necessary to determine a facility configuration and decide a layout thereof. As one of methods for improving productivity in the design phase, automatic layout and the like are considered.

Conventionally, production lines have been automated using main facilities (processing machinery) such as machine tools, injection molding machines, and inspection apparatuses as facilities for executing work that generates added value such as turning and drilling. In addition, the final layout of the production line has been designed on the basis of the layout of the main facilities, by subdividing and prioritizing other facilities such that setup facilities such as robot loaders are used as facilities for executing a setup work or a conveyance work that produces no added value such as welding and painting, and peripheral facilities such as material stockers, hand exchange stockers, traveling rails, and conveyors is used as facilities that are required concomitantly with the main facilities or the setup facilities to execute the work.

On the other hand, in recent years, there has been an increasing demand for combining the main facilities and the setup facilities from the beginning to be fully automated and efficiently operating the production line, and the degree of difficulty in layout design has been increasing. Above all, specifically, as setup facilities, not only floor surface fixing but also movable facilities that self-travel along guides on rails and ceilings have become widespread, so that the degree of freedom of layout has been increased, and the number of combinations of layout candidates has been exponentially increased accordingly. Therefore, for example, in the case of laying out three main facilities and two setup facilities, several tens of thousands to several 100 billion candidates can be generated in total.

JP 2007-317079 A discloses that an "apparatus for designing layout of a production line in which conveyance facilities of workpieces are connected in sequence, the apparatus including: a conveyance facility database that stores, for each type of the conveyance facilities, schematic planar shape information of the conveyance facilities, information on the carry-in position and carry-in direction of the workpieces to the conveyance facilities, and information on the carry-out position and carry-out direction of the workpieces from the conveyance facilities; a device that memorizes the type of the upstream conveyance facility and the type of the downstream conveyance facility in association with each other; a device that displays a pre-change layout in which a conveyance facility group is arranged, in accordance with a condition that the carry-out position and the carry-out direction of the upstream conveyance facility coincide with the carry-in position and the carry-in direction of the downstream conveyance facility; a change designation input unit that permits designation of the type of a conveyance facility to be added between the conveyance facilities memorized in association, designation of a command to delete any of the conveyance facilities memorized in association, designation of the type of a conveyance facility to be replaced with any of the conveyance facilities memorized in association; and a device that, if any change of "addition, deletion, and replacement" is input by the change designation input unit, displays a post-change layout obtained by rearranging a conveyance facility group located downstream of the changed conveyance facility, in accordance with a condition that the carry-in position and the carry-in direction of the downstream conveyance facility coincide with the carry-out position and the carry-out direction of the upstream conveyance facility.

The technique described in JP 2007-317079 A provides a layout design technique on the premise that facilities to be designed are fixed to a floor surface and are immovable. On the other hand, in order to calculate the layout of not only the floor surface-fixed facilities but also the movable facilities, it is necessary to design the layout considering not only the facilities that are to be fixed to the floor surface but also the movement method of the movable facilities such as floor-surface traveling or ceiling traveling. The technique described in JP 2007-317079 A is not directed to a layout design method considering the movement method of the facilities but is limited to the layout design of facilities that are to be fixed to the floor surface, and cannot provide a facility layout considering the movement method. Furthermore, if this problem is extended to a facility layout considering the movement method of the facilities, the number of combinations of layout candidates to be searched for increases exponentially with respect to an increase in the number of facilities. Therefore, a layout that optimizes the set KPI cannot be derived within a practical time.

SUMMARY

An object of the present invention is to improve productivity of design of a production line.

The present application includes a plurality of means for solving at least some of the above problems, and examples thereof are as follows.

One aspect of the present invention is a production line design apparatus including: a storage unit that stores facility configuration information that defines a number configuration including at least one or more main facilities that perform a main work in a production line and at least one or more setup facilities that perform an auxiliary work of the main facility, and arrangement pattern definition information including one or more arrangement patterns that define a combination of a movement method of the setup facility that is adoptable and a relative positional relationship between the main facility that is adoptable and the setup facility; and a processor that executes layout candidate generation processing of generating layout information that satisfies the number configuration by combining the arrangement patterns using the facility configuration information and the arrangement pattern definition information.

According to the present invention, it is possible to provide a technique for improving productivity of design of a production line.

Problems, configurations, and effects other than those described above will be clarified by the following description of embodiments.

BRIEF DESCRIPTION OF DRAWINGS

FIG. 2 is a diagram illustrating an example of a data structure of facility configuration information;

FIG. 3 is a diagram illustrating an example of a data structure of arrangement pattern definition information;

FIG. 4 is a diagram illustrating an example of a data structure of facility candidate information;

FIG. 5 is a diagram illustrating an example of a data structure of constraint condition information;

FIG. 6 is a diagram illustrating an example of a data structure of process assignment information;

FIG. 7 is a diagram illustrating an example of a data structure of layout information;

FIG. 8 is a diagram illustrating an example of a data structure of layout evaluation information;

FIG. 14 is a diagram illustrating an example of a candidate detail display screen; and FIG. 15 is a diagram illustrating an example of a cycle time display screen.

DETAILED DESCRIPTION

Figure 1:
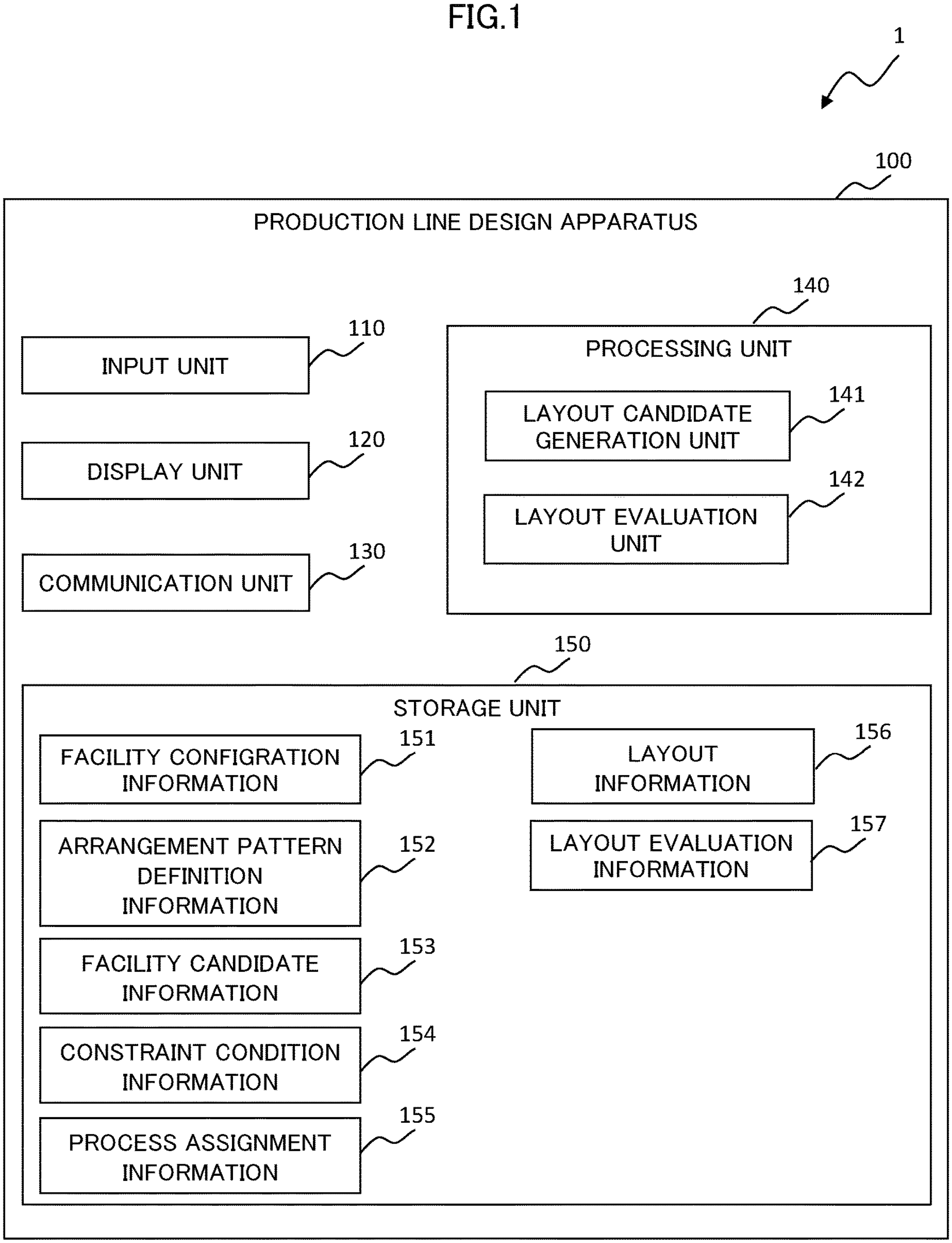
FIG. 1 is a diagram illustrating an example of a configuration of a production line design system.

The following description of embodiments will be divided into a plurality of sections or embodiments when it is necessary for the sake of convenience. However, unless otherwise specified, the sections or embodiments are not unrelated to each other but are in a relationship in which one constitutes some or all modifications, details, supplementary explanation, and the like of the other.

In the following embodiments, when the number of elements or the like (including number, numerical value, amount, range, and the like) is mentioned, the number is not limited to a specific number unless otherwise specified or obviously limited to the specific number in principle. The number may be equal to or greater than the specific number or may be equal to or less than the specific number.

In the following embodiments, it goes without saying that the components (including element steps and the like) are not necessarily essential unless otherwise specified or considered to be obviously essential in principle.

Similarly, in the following embodiments, when referring to the shapes, positional relationships, and the like of the components and the like, it is assumed that those substantially approximate or similar to the shapes and the like are included unless otherwise stated or unless clearly considered in principle. The same applies to the above numerical values and ranges.

In all the drawings for describing the embodiments, the same members are denoted by the same reference numerals in principle, and repeated description thereof will be omitted. However, the same member may be given different reference signs or names if there is a high possibility that using the same reference sign or name for the member before and after an environmental change or the like causes confusion. Hereinafter, each embodiment of the present invention will be described with reference to the drawings.

In the following description, the “input unit”, the “output unit”, the “display unit”, and the “interface device” may be one or more interface devices. The one or more interface devices may be at least one of the following:

- One or more input/output (I/O) interface devices. The input/output (I/O) interface device is an interface device for at least one of an I/O device and a remote display computer. The I/O interface device for the display computer may be a communication interface device. The at least one I/O device may be any of a user interface device, for example, an input device such as a keyboard and a pointing device, and an output device such as a display device.
- One or more communication interface devices. The one or more communication interface devices may be one or more communication interface devices of the same type (for example, one or more network interface cards (NIC)) or two or more communication interface devices of different types (for example, an NIC and a host bus adapter (HBA)).

In the following description, the “memory” refers to one or more memory devices that are an example of one or more storage devices, and may typically be a main storage device. At least one memory device in the memory may be a volatile memory device or a nonvolatile memory device.

In the following description, the “persistent storage device” may be one or more persistent storage devices that are an example of one or more storage devices. Typically, the persistent storage device may be a nonvolatile storage device (for example, an auxiliary storage device), and specifically may be a hard disk drive (HDD), a solid state drive (SSD), a non-volatile memory express (NVME) drive, or a storage class memory (SCM), for example.

In the following description, the “storage unit” or the “storage device” may be a memory or a memory and a persistent storage device.

In the following description, the “processing unit” or the “processor” may be one or more processor devices. At least one processor device may typically be a microprocessor device such as a central processing unit (CPU), but may be another type of processor device such as a graphics processing unit (GPU). At least one processor device may be of a single core or a multi-core. At least one processor device may be a processor core. At least one processor device may be a processor device in a broad sense such as a circuit that is an aggregate of gate arrays in a hardware description language that performs a part or all of processing (for example, a field-programmable gate array (FPGA), a complex programmable logic device (CPLD), or an application specific integrated circuit (ASIC)).

In the following description, functions may be described using an expression “yyy units”. However, the functions may be implemented by a processor executing one or more computer programs, may be implemented by one or more hardware circuits (for example, FPGA or ASIC), or may be implemented by a combination thereof. If the functions are implemented by a processor executing the program, the determined processing is performed using as appropriate a storage device and/or an interface device, and thus, the functions may be at least a part of the processor. The processing to be executed by the functions may be processing performed by a processor or a device including the processor. The programs may be installed from a program source. The program source may be a program distribution computer or a computer-readable recording medium (for example, a non-transitory recording medium), for example. The description of each function is an example, and a plurality of functions may be integrated into one function or one function may be divided into a plurality of functions.

In the following description, processing may be described as to be performed by a "program" or a "processing unit". However, the processing described as to be performed by the program may be processing performed by a processor or a device including the processor. Two or more programs may be implemented as one program, or one program may be implemented as two or more programs.

In the following description, information of which an output is obtained in response to an input may be described with an expression such as "xxx information". However, the information may have any data structure, or may be a learning model represented by a neural network, a genetic algorithm, or a random forest that generates an output in response to an input. In the following description, the data structure of each piece of information is an example. One data structure may be divided into two or more data structures, or all or some of two or more data structures may be one data structure.

In the following description, the "system" may be a system including one or more physical computers, or may be a system (for example, a cloud computing system) implemented on a physical calculation resource group (for example, a cloud infrastructure). That the production line design apparatus "displays" information for display may mean that the information for display is displayed on a display device of a computer, or that the computer transmits the information for display to a display computer (in the latter case, the information for display is displayed on the display computer).

[First Embodiment] In the present embodiment, the target issue is to, based on the premise that the order of main facilities used for all production target workpieces is the same in a line of a flow shop, decide a layout design of main facilities, setup facilities, and peripheral facilities considering the movement method of the setup facilities from an input information group including facility configuration information, constraint condition information such as a floor space and a cycle time, and process assignment information.

The job shop here refers to a production line organization form in which the order of the main facilities used in all the production target workpieces is the same, that is, the routes of the main facilities used are the same.

The main facilities are facilities that execute work that generates added value. For example, the main facilities include a machine tool, an injection molding machine, an inspection apparatus, and the like. The setup facilities are facilities that execute setup work that generates no added value, such as work of attaching and detaching a workpiece to and from a main facility and work of conveying a workpiece between main facilities. For example, the setup facilities include an industrial robot, a gantry loader, an automatic guided vehicle with a robot arm, and the like. The peripheral facilities are facilities necessary for the main facilities or the setup facilities to perform operations. For example, the peripheral facilities include a material stocker, a conveyor, a floor traveling rail, a ceiling traveling rail, and the like.

The production line in the present embodiment includes one or more stations. It is assumed that the station is constituted by one setup facility and one or more main facilities. Each station may also include main facilities and peripheral facilities required by the setup facilities to perform operations.

For a product to be produced, one or more processes are defined to complete production of the product. All processes may be assigned to any of the main facilities and a plurality of processes may be assigned to one main facility.

FIG. 1 is a diagram illustrating an example of a configuration of a production line design system. The production line design system 1 includes a production line design apparatus 100 and is provided at a manufacturing site (area) or a facility outside the manufacturing site. The production line design system 1 includes a device group corresponding to the use environment of a display computer communicably connected via a network (not illustrated).

Although not illustrated, the network is any one of or a combination of a local area network (LAN), a wide area network (WAN), a virtual private network (VPN), a communication network using a general public line such as the Internet in part or in whole, a mobile phone communication network, and the like, for example. The network may be a wireless communication network such as Wi-Fi (registered trademark) or 5th Generation (5G).

The production line design apparatus 100 includes an input unit 110, a display unit 120, a communication unit 130, a processing unit 140, and a storage unit 150. The input unit 110 is displayed and operated on a screen, for example, and receives input information operated and input through a keyboard or a mouse. The display unit 120 is a kind of processing unit that produces a display output with presentation processing on information to be displayed on the output screen, and performs screen control on operations input on the screen, such as scrolling, sorting, and highlight display.

The display unit 120 displays the result of a combination of arrangement patterns, layout information 156, and a two-dimensional or three-dimensional facility layout diagram related to the layout information 156. The display unit 120 also displays the result of a combination of arrangement patterns, the layout information 156, and the result information of layout evaluation processing including the evaluation as to whether the layout information is applicable to the production line. The display unit 120 also displays process assignment information 155 and the cycle time calculated for each piece of the layout information 156.

The communication unit 130 communicates with a device group according to the use environment of a display computer communicably connected via a network (not illustrated). The processing unit 140 includes a layout candidate generation unit 141 and a layout evaluation unit 142. The storage unit 150 includes facility configuration information 151, arrangement pattern definition information 152, facility candidate information 153, constraint condition information 154, process assignment information 155, layout information 156, and layout evaluation information 157.

FIG. 2 is a diagram illustrating an example of a data structure of the facility configuration information. The facility configuration information 151 is information that defines the minimum necessary production facilities constituting the production line to be designed. The facility configuration information 151 has, in association with a line ID 151*a* and a station ID 151*b* of a line and a station that execute production, a facility large category 151*c* that identifies whether the facilities to be arranged is main facilities, setup facilities, or peripheral facilities, a facility name 151*d*, a purchase price 151*e*, an outer lateral width 151*f*, an outer vertical width 151*g*, and an outer height 151*h*. That is, it can be said that the facility configuration information 151 is information that defines a configuration of a number of facilities including at least one or more main facilities that perform main work in the production line and at least one or more setup facilities that perform auxiliary work of the main facilities.

If the facility large category 151*c* is "setup facility", the facility is a setup facility, and the setup facility requires an additional peripheral facility depending on the movement method. For example, if the movement method of the setup facility is "floor surface traveling rail", the "floor surface traveling rail" is required as a peripheral facility. Regarding the peripheral facility, a facility necessary for the movement method of the setup facility is selected from the facility candidate information 153 by the process of the layout candidate generation unit 141 described later, and is set to the layout information 156.

An example of the facility configuration information 151 indicates that the station ID 151*b* "1" includes one robot ("robot A"), one processing machine ("processing machine A"), and one material stocker ("material stocker A"). Similarly, an example of the facility configuration information 151 indicates that the station ID 151*b* "2" includes one conveyor ("conveyor C"), one robot ("robot B"), three processing machines ("processing machine B", "processing machine C", and "processing machine D"), and one product stocker ("product stocker A").

For example, if not only a processing machine but also an injection molding machine and an inspection device are included as main facilities, the facility large category 151*c* may separately have the main facilities as a "main facility 1", a "main facility 2", and a "main facility 3". Facilities that execute conveyance of workpieces between production lines, such as an automatic conveyance vehicle and a forklift, may be set as "inter-line conveyance facilities".

The purchase price 151*e* is information for specifying the purchase price of a facility. The outer lateral width 151*f*, the outer vertical width 151*g*, and the outer height 151*h* are information for specifying the lateral width, the vertical width, and the height of the bounding box of the facility, respectively.

FIG. 3 is a diagram illustrating an example of a data structure of arrangement pattern definition information. The arrangement pattern definition information 152 is information that defines the movement method of an applicable setup facilities and the relative positional relationship between the applicable main facility and the setup facility in association with each other. In other words, the arrangement pattern definition information 152 can be said to be information including one or more arrangement patterns that define a combination of the movement method of the adoptable setup facility and the relative positional relationship between the adoptable main facility and the setup facility. In addition, an arrangement pattern is associated with the arrangement pattern definition information 152 according to the ratio between the number of the main facility and the number of the setup facility.

The arrangement pattern definition information 152 has, for each arrangement pattern ID 152*a*, a main facility/setup facility number ratio 152*b*, a setup facility movement method 152*c*, and a main facility/setup facility relative position 152*d* in association with each other. The main facility/setup facility number ratio 152*b* is information on the number of main facilities that can be handled by one setup facility. The setup facility movement method 152*c* is information for specifying the movement method of the setup facility (floor surface fixing or floor surface traveling rail). The main facility/setup facility relative position 152*d* is information for specifying the arrangement position of the main facility with respect to the setup facility.

If the main facility/setup facility relative position 152*d* is "upper stage", as illustrated in a plan view 152*e*, the positional relationship is established in which the main facility is arranged on the upper stage, that is, on the upper side of the setup facility. If the main facility/setup facility relative position 152*d* is "upper and lower stages", as illustrated in a plan view 152*f*, the positional relationship is established in which the main facility is arranged on the upper stage and the lower stage, that is, both the upper side and the lower side of the setup facility.

If the main facility/setup facility relative position 152*d* is "upper stage/parallel", as illustrated in a plan view 152*g*, the positional relationship is established in which a plurality of main facilities is arranged side by side in order from the left on the upper stage of the setup facility. Specifically, the positional relationship is established in which the main facilities are arranged side by side in parallel with the longitudinal direction of the floor surface traveling rail required for the floor surface traveling, as in the arrangement relationship of a processing machine B, a processing machine C, and a processing machine D with respect to a robot B and a floor surface traveling rail C in a layout diagram 620 illustrated in FIG. 14 described later.

If the main facility/setup facility relative position 152*d* is "upper/lower/parallel" as illustrated in a plan view 152*h*, the positional relationship is established in which the main facilities are arranged in the horizontal direction in order from the left side using the spaces on the upper stage and the lower stage of the setup facility.

The setup facility movement method 152*c* includes either "floor surface fixing" or the "floor surface traveling rail", but may also include "floor surface free traveling" such as an automatic conveyance facility with a robot arm or "ceiling traveling rail" such as an industrial robot with a traveling rail for ceiling suspension, for example.

FIG. 4 is a diagram illustrating an example of a data structure of facility candidate information. The facility candidate information 153 is information that defines specifications of a peripheral facility required according to the movement method of a setup facility. The facility candidate information 153 has, for each facility ID 153*a* of a candidate facility, a facility large category 153*b* for specifying whether the facility is a main facility, a setup facility, or a peripheral facility, a facility name 153*c*, a rail length 153*d* indicating the length of the facility, a purchase price 153*e*, and a movement speed 153*f* for specifying a movement speed of the facility if the facility moves the setup facility or the workpiece, in association with each other.

In the facility configuration information 151, minimum necessary facilities are set regardless of the movement method of the setup facility, whereas in the facility candidate information 153, facilities that change in necessity or unnecessity according to the movement method of the setup facility are set. For example, if the movement method of the setup facility is "floor surface fixing", the necessary peripheral facility is a "floor surface fixing tool". Similarly, if the movement method of the setup facility is the "floor surface traveling rail", the necessary peripheral facility is the "floor surface traveling rail".

The facility candidate information 153 may include rail width information. Using the information of the rail width makes it possible to, if there is a constraint of the floor space, select a facility candidate satisfying the constraint of the floor space.

FIG. 5 is a diagram illustrating an example of a data structure of constraint condition information. The constraint condition information 154 is information that defines conditions to be satisfied by the production line to be designed. The constraint condition information 154 has a constraint condition item 154*b* and a set value 154*c* in association with each other for each constraint ID 154*a*. The constraint condition information includes an upper limit of the cycle time of the main facilities.

For example, if the constraint condition item 154*b* is "cycle time upper limit" and its set value is "300 seconds", the constraint condition item is used for a layout evaluation unit 142 described later to perform a process of evaluating that the constraint is satisfied if the value of the cycle time is equal to or less than the upper limit "300 seconds". Similarly, if the constraint condition item 154*b* is "floor space vertical width upper limit" and its set value is "6 meters (m)", the constraint condition item is used for the layout evaluation unit 142 to perform a process of evaluating that the constraint is satisfied if the value of the floor space vertical width is equal to or less than the upper limit "6 m". The same applies to the floor space lateral width upper limit.

FIG. 6 is a diagram illustrating an example of a data structure of process assignment information. The process assignment information 155 is information that defines facilities assigned to a process of a product to be produced and a work time of the process. In other words, the process assignment information 155 is information including a main facility, a process performed in the main facility, a setup facility used for the process, and the work time of the process.

The process assignment information 155 has a process content 155*c*, a line ID 155*d*, a station ID 155*e*, a main facility 155*f*, a main facility work time 155*g*, a setup facility 155*h*, and a setup facility work time 155*j* in association with a product ID 155*a* and a process ID 155*b*.

The process content 155*c* is text information indicating the content of the process. The line ID 155*d*, the station ID 155*e*, and the main facility 155*f* are information for specifying the main facility in charge of the process and the logical arrangement thereof. The main facility work time 155*g* is the work time of a process performed in the main facility. The setup facility 155*h* is information for specifying the setup facility for performing the setup work of the process performed in the main facility. The setup facility work time 155*j* is the work time of the setup performed in the setup facility of the process.

FIG. 7 is a diagram illustrating an example of a data structure of layout information. The layout information 156 is information that defines arrangement coordinates of facilities constituting a production line to be designed. In other words, the layout information 156 is information indicating a result of arrangement in which arrangement patterns of facilities are combined to satisfy the configuration of the number of facilities.

In the present embodiment, the layout is indicated by coordinates in which the lower left corner of the production line as viewed from above is an origin, the rightward direction (horizontal direction) is an x direction, and the upward direction (vertical direction) orthogonal to the x direction is a y direction. The layout information 156 has, for each line ID 156*a* and station ID 156*b* of the target line, a facility name 156*c*, a central X coordinate 156*d*, a central Y coordinate 156*e*, a rotation amount 156*f*, an outer lateral width 156*g*, and an outer vertical width 156*h* in association with each other.

FIG. 8 is a diagram illustrating an example of a data structure of the layout evaluation information 157. The layout evaluation information 157 is information that stores an evaluation value based on the evaluation index of a layout. The layout evaluation information 157 has, a cycle time 157*b*, a floor space vertical width 157*c*, a floor space lateral width 157*d*, and a total investment cost 157*e* for each layout candidate ID 157*a*, as evaluation values, in association with one another.

The description returns to FIG. 1. The processing unit 140 includes a layout candidate generation unit 141 and a layout evaluation unit 142. Using the facility configuration information 151 and the arrangement pattern definition information 152, the layout candidate generation unit 141 executes a layout candidate generation process of generating a plurality of pieces of layout information 156 satisfying the numbers of the main facilities and the setup facilities by combining the arrangement patterns. The layout candidate generation unit 141 also arranges the peripheral facilities by using the facility candidate information 153 according to the positions of the setup facilities in the arrangement pattern, and includes the peripheral facilities in the layout information. The layout candidate generation unit 141 also specifies the arrangement pattern by using the ratio between the number of the main facilities and the number of the setup facilities.

The layout evaluation unit 142 calculates an evaluation value according to the evaluation index for each layout included in the layout information generated by the layout candidate generation unit 141, and outputs the layout evaluation information 157. The layout evaluation unit 142 also calculates, for each main facility, a cycle time including the work time of the main facility, the work time of the setup facility, and the movement time of the setup facility using the layout information 156 and the process assignment information 155, and executes a layout evaluation process of evaluating that the layout information satisfying the constraint condition of the constraint condition information 154 is applicable to the production line.

If the process assignment information 155 includes a plurality of processes to be performed by the main facility, the layout evaluation unit 142 calculates the cycle time by summing the work times of the processes for each main facility. If the process assignment information 155 includes a plurality of processes to be performed by the setup facility, the layout evaluation unit 142 calculates the work time of each setup facility by summing the work times of the processes of each setup facility. The layout evaluation unit 142 calculates a quotient of the movement distance of the setup facility corresponding to the process assignment information 155 and the movement speed of the setup facility included in the facility candidate information, as the movement time of the setup facility.

Figure 9:
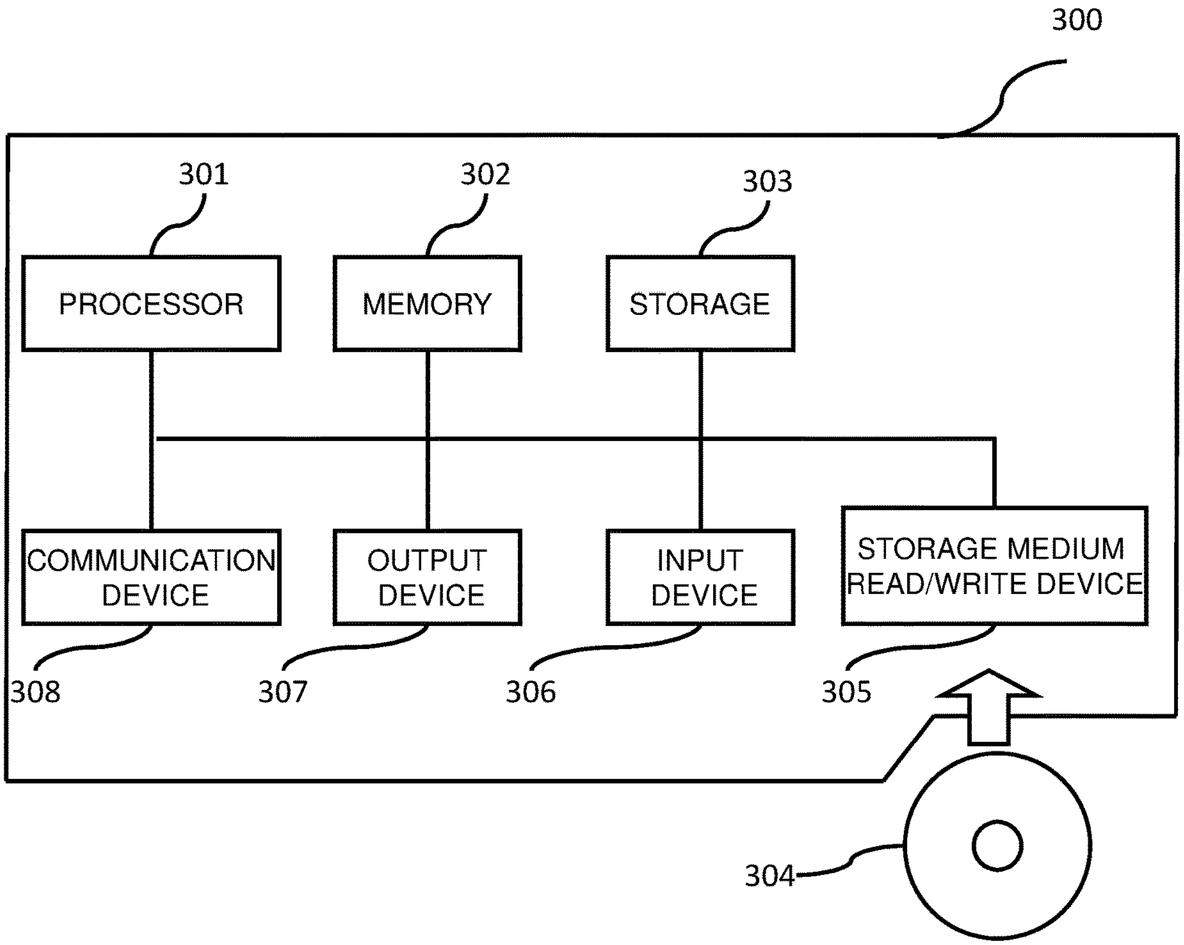
FIG. 9 is a diagram illustrating an example of a hardware configuration of a production line design apparatus.

FIG. 9 is a diagram illustrating an example of a hardware configuration of the production line design apparatus. The production line design apparatus 100 can be implemented by a general computer 300 that includes a processor 301, a memory 302, a storage 303 such as a hard disk drive (HDD), a storage medium read/write device 305 that reads or writes information from and to a portable storage medium 304 such as a compact disk (CD) or a digital versatile disk (DVD), an input device 306 such as a keyboard, a mouse, or a bar code reader, an output device 307 such as a display, and a communication device 308 that communicates with another computer via a communication network such as the Internet, or a network system including a plurality of the computers 300.

For example, the processing unit 140 can be implemented by loading a predetermined program from the storage 303 into the memory 302 and executing the program by the processor 301. The input unit 110 and the display unit 120 can be implemented by the processor 301 using the input device 306 and the output device 307. The storage unit 150 can be implemented by the processor 301 using the memory 302 or the storage 303.

The predetermined program may be downloaded to the storage 303 from the storage medium 304 via the storage medium read/write device 305 or from a network via the communication device 308, then loaded onto the memory 302, and executed by the processor 301.

The predetermined program may be directly loaded onto the memory 302 from the storage medium 304 via the storage medium read/write device 305 or from a network via the communication device 308 and executed by the processor 301. The communication unit 130 can be implemented by the processor 301, the memory 302, and the communication device 308.

The present invention is not limited to the above, and the production line design apparatus 100 may be a wearable computer worn by an operator, such as a headset, goggles, glasses, or an intercom.

Figure 10:
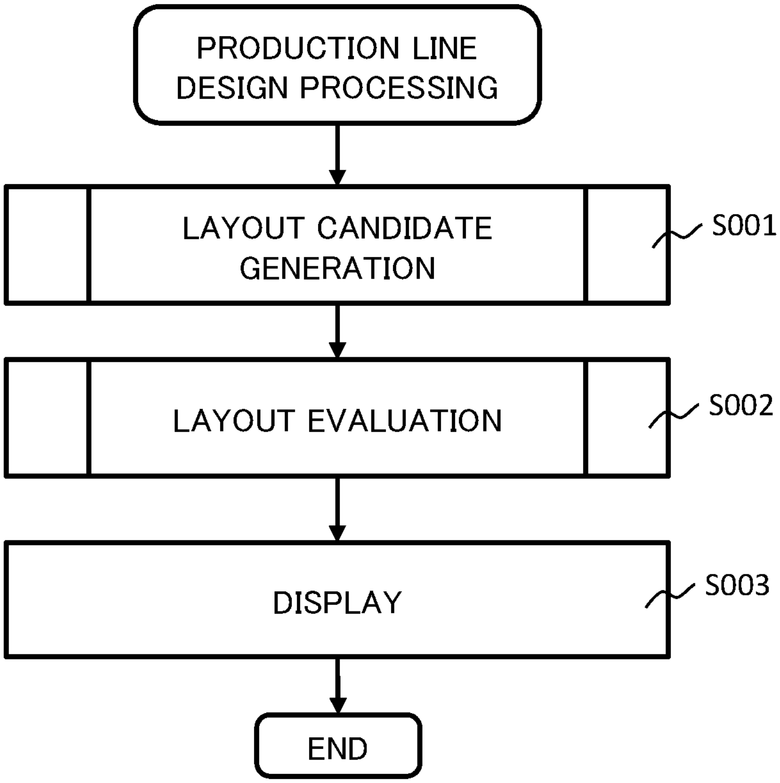
FIG. 10 is a diagram illustrating an example of a flowchart of production line design processing.

FIG. 10 is a diagram illustrating an example of a flow of production line design processing. The production line design processing is started when a start instruction is received from the user via an interface device.

First, the layout candidate generation unit 141 executes a layout candidate generation process to be described later (step S001). Then, the layout evaluation unit 142 executes layout evaluation processing described later (step S002). Then, the display unit 120 displays the acquired result (step S003).

The above is an example of the flow of the production line design processing. According to the production line design processing, it is possible to generate a plurality of layout candidates that can include not only the floor surface-fixed facilities but also movable setup facilities such as floor surface traveling or ceiling traveling in a short time, and to derive an optimum layout from a wide range of layout candidates.

Figure 11:
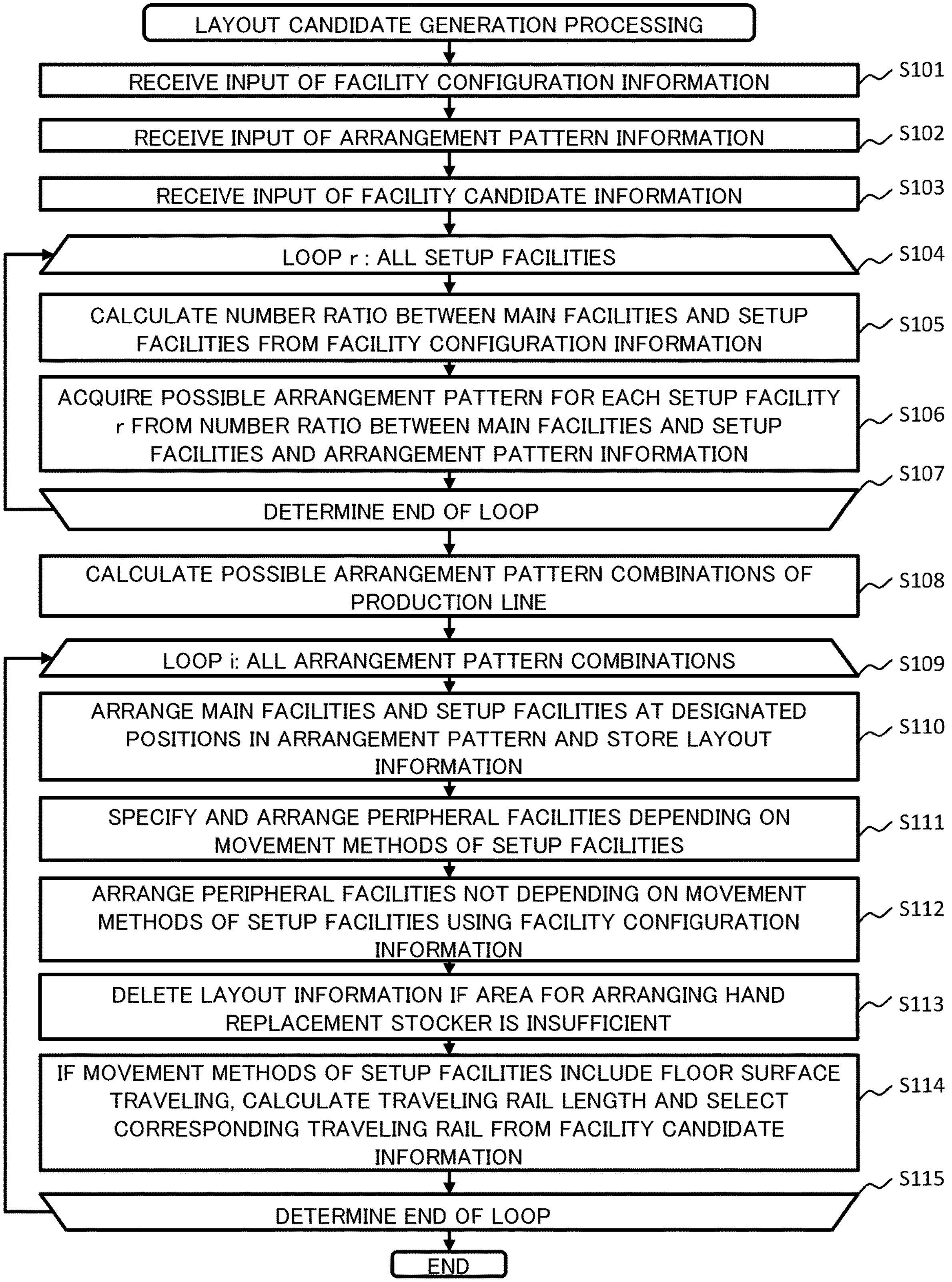
FIG. 11 is a diagram illustrating an example of a flowchart of layout candidate generation processing.

FIG. 11 is a diagram illustrating an example of a flow of layout candidate generation processing. The layout candidate generation processing is started in step S001 of the production line design processing.

First, the input unit 110 receives an input of the facility configuration information 151 (step S101). Then, the input unit 110 receives an input of the arrangement pattern definition information 152 (step S102). Then, the input unit 110 receives an input of the facility candidate information 153 (step S103). The input of the facility configuration information 151, the arrangement pattern definition information 152, and the facility candidate information 153 received by the input unit 110 may be received by the input unit 110 based on input contents to a predetermined input screen, or may be received by input of a path or the like for accessing data compiled as a database or a file.

Then, the layout candidate generation unit 141 acquires setup facilities from among the facilities set in the facility configuration information 151, and executes the following loop process on all the setup facilities r (steps S104 and S107).

First, the layout candidate generation unit 141 calculates the ratio between the numbers of the main facilities/setup facilities from the facility configuration information 151 (step S105). Specifically, the layout candidate generation unit 141 acquires the number of main facilities by counting the number of facilities of which the facility large category 151*c* is “main facility” for each combination of the line ID 151*a* and the station ID 151*b* using the facility configuration information 151, and calculates the ratio between the number of main facilities and the number of setup facilities.

For example, in the facility configuration information 151 illustrated in FIG. 2, since there are three items with line ID=“1”, station ID=“2”, and facility large category=“main facility”, and there is one item with line ID=“1”, station ID=“2”, and facility large category=“setup facility”, the ratio between the numbers of main facilities and setup facility is “3/1=3”.

Then, the layout candidate generation unit 141 assigns and acquires a possible arrangement pattern for each setup facility r from the ratio of the numbers of main facilities/setup facilities and the arrangement pattern definition information 152 (step S106).

For example, if the ratio between the number of main facilities and the number of setup facilities acquired in step S105 is “1”, the layout candidate generation unit 141 assigns the arrangement pattern ID “1” corresponding to the ratio between the number of main facilities and the number of setup facilities 152*b*=“1” in the arrangement pattern definition information 152.

Similarly, if the ratio between the number of main facilities and the number of setup facilities acquired in step S105 is “3”, the layout candidate generation unit 141 searches for an item corresponding to the ratio between the number of main facilities and the number of setup facilities 152*b*=“3” and assigns the arrangement pattern IDs “3” and “4”. Then, the layout candidate generation unit 141 returns the control to step S104 until all the setup facilities r are selected, and after all the setup facilities r are selected, the layout candidate generation unit 141 proceeds the control to step S108.

Then, the layout candidate generation unit 141 calculates a combination of possible arrangement patterns of the production line to be designed (step S108). For example, in the case of the example of the facility configuration information 151, the possible arrangement pattern of the “robot A” is the arrangement pattern with ID=“1”, which is the first setup facility in the line, and the possible arrangement pattern of “robot B” is the arrangement pattern with ID=“3” or “4”, which is the second setup facility in the line. Therefore, there are two possible combinations of arrangement patterns (1, 3) and (1, 4) (i=2).

Then, the following loop process is executed on all the arrangement pattern combinations i (steps S109 and S115).

First, the layout candidate generation unit 141 arranges the main facilities and the setup facilities at positions designated by the arrangement pattern, and generates the layout information 156 (step S110). If the arrangement pattern is “upper stage”, the layout candidate generation unit 141 arranges a facility $j_1$ above a facility $j_2$ with the central X coordinates having the same value. At that time, the layout candidate generation unit 141 uses the following equation (1) to determine the Y coordinate so that the facility $j_1$ and the facility $j_2$ do not overlap in the y direction.

[Mathematical Formula 1]

$$y_{j1} \geq y_{j2} + \{(1-r_{j1})H_{j1} + r_{j1}W_{j1} + (1-r_{j2})H_{j2} + r_{j2}W_{j2}\}/2 \quad (1)$$

where $y_{j1}$ and $y_{j2}$ are central Y-coordinates of the facility $j_1$ and the facility $j_2$, $r_{j1}$ and rig are rotation amounts of the facility $j_1$ and the facility $j_2$, $H_{j1}$ and $H_{j2}$ are external vertical widths of the facility $j_1$ and the facility $j_2$, and $W_{j1}$ and $W_{j2}$ are external lateral widths of the facility $j_1$ and the facility $j_2$.

Since the above equation is an equation used for arranging the facility $j_1$ above the facility $j_2$, in the case of arranging the main facility at the upper stage of the setup facility, the layout candidate generation unit 141 sets the facility $j_1$ as the main facility and the facility $j_2$ as the setup facility. Conversely, in the case of arranging the main facility at the lower stage of the setup facility, the layout candidate generation unit 141 achieves this by setting the facility $j_1$ as the setup facility and the facility $j_2$ as the main facility.

Similarly, when the arrangement pattern is "parallel", the layout candidate generation unit 141 arranges the facility $j_1$ on the right side of the facility $j_2$. At that time, the layout candidate generation unit 141 uses the following equation (2) to determine the X coordinate so that the facility $j_1$ and the facility $j_2$ do not overlap in the x direction.

[Mathematical Formula 2]

$$x_{j1} \geq x_{j2} + \{(1-r_{j1})W_{j1} + r_{j1}H_{j1} + (1-r_{j2})W_{j2} + r_{j2}H_{j2}\}/2 \quad (2)$$

where $x_{j1}$ and $x_{j2}$ are central X-coordinates of the facility $j_1$ and the facility $j_2$, and the other symbols are the same as those in the equation (1). For example, in the case of arranging the processing machine A on the right side of the processing machine B, the facility $j_1$ is set as the processing machine A and the facility $j_2$ is set as the processing machine B. On the contrary, in the case of arranging the processing machine A on the left side of the processing machine B, the facility $j_1$ is set as the processing machine B and the facility $j_2$ is set as the processing machine A. With the above-described equations (1) and (2), it is possible to derive a layout in which the facilities do not overlap each other. Furthermore, the layout candidate generation unit 141 may set a margin space between facilities in order to secure the work flow line of the worker, for example.

For example, if ID=(1, 3) is selected as a combination of the arrangement patterns in the facility configuration information 151, the arrangement pattern ID 152*a*="1", the setup facility movement method 152*c*="floor surface fixing", and the main facility/setup facility relative position 152*d*="upper stage" correspond to the first setup facility. Therefore, the layout candidate generation unit 141 can arrange the processing machine A on the upper stage with respect to the robot A with the floor surface fixed, like the processing machine A and the robot A illustrated in the layout diagram 620 of FIG. 14.

Similarly, the arrangement pattern ID 152*a*="3", the setup facility movement method 152*c*="floor surface traveling rail", and the main facility/setup facility relative position 152*d*="upper stage/parallel" correspond to the second setup facility. Therefore, the layout candidate generation unit 141 can arrange the processing machine B, the processing machine C, and the processing machine D in parallel in the space on the upper stage of the robot B having the floor surface traveling rail, like the processing machine B, the processing machine C, the processing machine D, the robot B, and the traveling rail C illustrated in the layout diagram 620 of FIG. 14.

Then, the layout candidate generation unit 141 arranges the peripheral facilities depending on the movement method of the setup facilities and updates the layout information 156 (step S111). For example, if the movement method of the setup facility with the line ID "1" and the station ID "1" is "floor surface fixing", the layout candidate generation unit 141 selects "floor surface fixing tool" from the facility candidate information 153, arranges the central X coordinate and the central Y coordinate at the same value as the robot A, and updates the layout information 156. For example, if the movement method of the setup facility with the line ID "1" and the station ID "2" is "floor surface traveling rail", the layout candidate generation unit 141 selects "floor surface traveling rail" from the facility candidate information 153, arranges the central X coordinate at the same value as the robot B and arranges the central Y coordinate at the midpoint value between the left end surface of the processing machine B and the right end surface of the processing machine D, and updates the layout information 156.

For example, in the case of the facility configuration information 151, the layout candidate generation unit 141 arranges the material stocker A at the robot A corresponding to the first setup facility, and arranges the product stocker A at the robot B corresponding to the last setup facility, as illustrated in the layout diagram 620. Similarly, the layout candidate generation unit 141 arranges the conveyor C for inter-process conveyance between the robot A as the first setup facility and the robot B as the second setup facility.

Then, the layout candidate generation unit 141 arranges the peripheral facilities that does not depend on the movement method of the setup facilities from the facility configuration information, and updates the layout information 156 (step S112). For example, the layout candidate generation unit 141 can generate a layout in which the "material stocker A", which is the peripheral facility assigned to the line ID "1" and the station ID "1", is arranged on the left side of the "robot A" as illustrated in the layout diagram 620, by setting the facility $j_1$ as the "robot A" and the facility $j_2$ as the "material stocker A" in the above equation (2).

Similarly, the layout candidate generation unit 141 can generate a layout in which the "conveyor C", which is the peripheral facility assigned to the line ID "1" and the station ID "2", is arranged on the left side of the "robot B" as illustrated in the layout diagram 620, by setting the facility $j_1$ as the "robot B" and the facility $j_2$ as the "conveyor C" in the above equation (2).

If the area for arranging the stocker for hand replacement, which is a peripheral facility required by the setup facility, is insufficient, the layout candidate generation unit 141 deletes the layout information and returns the control to step S109 (step S113).

If the movement method of the setup facility is the floor surface traveling rail, the layout candidate generation unit 141 calculates a necessary traveling rail length, selects the corresponding traveling rail from the facility candidate information 153, and updates the layout information 156 (step S114). For example, in the case of a combination of the robot B and the floor surface traveling rail C illustrated in FIG. 14, since the robot B is in charge of setup from the processing machine B to the processing machine D, the required traveling rail length is 6.0 m that is determined by adding 1.5 m, which is the outer dimension of the robot B along the X-axis direction, to 4.5 m, which is the distance of the central coordinates of the processing machine B and the processing machine D along the X-axis direction. The layout candidate generation unit 141 selects the floor surface traveling rail C of which the rail length 153*d* of the facility candidate information 153 is "6.0" as a necessary peripheral facility.

If the value of the necessary traveling rail length is not present in the rail length 153*d*, such as in a case where the necessary traveling rail length is 5.5 m, the layout candidate generation unit 141 selects the rail length 153*d* of "6.0" as the value closest to 5.5 m from among the values larger than 5.5 m that is the necessary traveling rail length.

The layout candidate generation unit 141 returns the control to step S109 until all the arrangement pattern combinations are selected, and after all the arrangement pattern combinations i are selected, the layout candidate generation unit 141 ends the layout candidate generation processing.

The above is an example of the flow of the layout candidate generation processing. According to the layout candidate generation processing, using the arrangement pattern definition information 152 makes it possible to generate a plurality of layout candidates including not only the floor surface-fixed facilities but also movable facilities that perform floor surface traveling or ceiling traveling in a short time.

Figure 12:
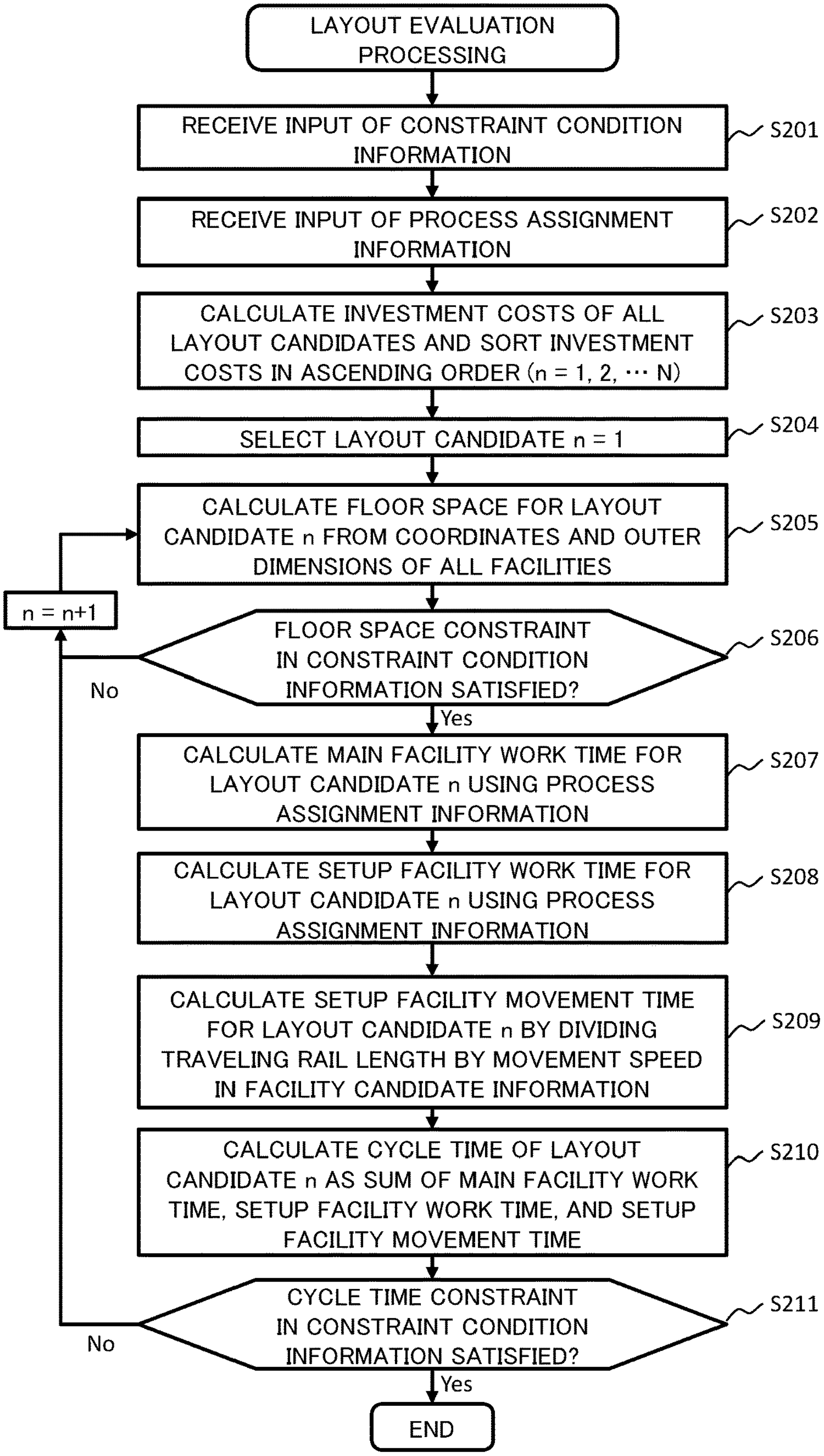
FIG. 12 is a diagram illustrating an example of a flowchart of layout evaluation processing.

FIG. 12 is a diagram illustrating an example of a flow of layout evaluation processing. The layout evaluation processing is started in step S002 of the production line design processing.

First, the input unit 110 receives an input of the constraint condition information 154 (step S201). The input unit 110 receives an input of the process assignment information 155 (step S202). The input of the constraint condition information 154 and the process assignment information 155 received by the input unit 110 may be received by the input unit 110 based on input contents to a predetermined input screen, or may be received by input of a path or the like for accessing data compiled as a database or a file.

The layout evaluation unit 142 calculates the investment costs as the sum of purchase prices of all the facilities in all N layout candidates generated in the layout candidate generation processing, and sorts the N layout candidates in ascending order of the investment costs (step S203). From among the sorted layout candidates, the layout evaluation unit 142 selects one with n=1, that is, the smallest investment cost (step S204).

Then, the layout evaluation unit 142 calculates the floor space vertical width 157*c* and the floor space lateral width 157*d* for the selected layout candidate n using the coordinates and outer dimensions of all the facilities (step S205). The layout evaluation unit 142 calculates the Y coordinate of the upper end surface of each facility using the following equation (3) and then acquires the maximum value to determine the floor space vertical width 157*c*.

[Mathematical Formula 3]

$$Y_{top(j)}=Y_{mid(j)}+(1-R_{(j)}/90)Y_{size(j)}+(R_{(j)}/90)X_{size(j)} \qquad (3)$$

where $Y_{top(j)}$ is the Y coordinate of the upper end surface of the facility j, $Y_{mid(j)}$ is the central Y-coordinate of the facility j, $Y_{size(j)}$ is the external vertical width of the facility j, $X_{size(j)}$ is the external lateral width of the facility j, and $R_{(j)}$ is the rotation amount of the facility j.

Similarly, the layout evaluation unit 142 calculates the X coordinate of the right end surface of each facility using the following equation (4), and then acquires the maximum value to determine the floor space lateral width 157*d*.

[Mathematical Formula 4]

$$X_{right(j)}=X_{mid(j)}+(1-R_{(j)}/90)X_{size(j)}+(R_{(j)}/90)Y_{size(j)} \qquad (4)$$

where $X_{right(j)}$ is the X coordinate of the right end surface of the facility j, and $X_{mid(j)}$ is the central X-coordinate of the facility j, and the other symbols are the same as those in the equation (4).

For example, in the case of the layout candidate illustrated in FIG. 14, the layout evaluation unit 142 calculates the Y coordinates of the upper end surfaces of all the facilities using the equation (3) and then acquires the maximum value, so that the floor space vertical width 157*c* is 5.5 m obtained by adding 1.5 m, which is half of the outer vertical width of the processing machine B, to 4.0 m, which is at the central Y coordinate of the processing machine B. The floor space vertical width 157*c* takes on the same value even when being calculated with reference to not only the processing machine B but also the processing machine C or the processing machine D. Similarly, the layout evaluation unit 142 calculates the X coordinates of the right end surfaces of all the facilities using the equation (4) and then acquires the maximum value, so that the floor space lateral width 157*d* is 13.5 m obtained by adding 0.5 m, which is half of the outer vertical width, to 13.0 m, which is at the central X coordinate of the product stocker A.

The reason why the outer vertical width is used here instead of the outer lateral width in the calculation of the floor space lateral width 157*d* is that the facility is rotated by 90 degrees as the rotation amount (degree) is described as "90" in the layout information 610 of FIG. 14. In this case, it can also be seen from the fact that the third term on the right side is "$Y_{size(j)}$" since the second term on the right side is equivalent to "0" in the equation (4).

The layout evaluation unit 142 determines whether the layout candidate n satisfies the floor space constraint in the constraint condition information 154 (step S206). Specifically, the layout evaluation unit 142 determines whether both the vertical width and the lateral width of the floor space (the width of the bounding box of the floor space) of the layout candidate n satisfy the floor space constraint.

For example, the layout evaluation unit 142 determines that the floor space vertical width and the lateral width of the layout candidate in FIG. 14 are "5.5 m" and "13.5 m", respectively, with respect to the upper limit of the floor space vertical width of "6 m" and the upper limit of the floor space lateral width of "14 m" in the constraint condition information 154, sets the determination result in step S206 to "Yes". When either the upper limit of the floor space lateral width or the upper limit of the floor space vertical width cannot be satisfied, the layout evaluation unit 142 sets the determination result in step S206 to "No".

If the layout candidate n does not satisfy the floor space constraint ("No" in step S206), the layout evaluation unit 142 increments the number of processes n of the layout candidate (that is, changes the setting such that a layout candidate different from the layout candidate is used), and returns the control to step S205.

If the layout candidate n satisfies the floor space constraint ("Yes" in step S206), the layout evaluation unit 142 refers to the main facility work time 155*g* in the process assignment information 155 for the layout candidate n to acquire the main facility work time (step S207). For example, the layout evaluation unit 142 acquires, as "120 seconds", the main facility work time of the main facility 155*f* "processing machine A" that is assigned with the process with the product ID 155*a* "1" and the process ID 155*b* "1" in the process assignment information 155.

Then, the layout evaluation unit 142 refers to the setup facility work time 155*j* in the process assignment information 155 for the layout candidate n to acquire the setup facility work time (step S208). For example, the layout evaluation unit 142 acquires, as "30 seconds", the setup work time of the setup facility 155*h* "robot A" that is assigned with the process with the product ID 155*a* "1" and the process ID 155*b* "1" in the process assignment information 155

Then, the layout evaluation unit 142 calculates the setup facility movement time by dividing the traveling rail length by the movement speed 153*f* in the facility candidate information 153 for each setup facility included in the layout candidate n (step S209). For example, by the calculation method using the maximum value of the movement distance of the robot illustrated in FIG. 15, the layout evaluation unit 142 calculates the setup facility movement time of the setup facility 155*h* "robot B" that is assigned with the process with the product ID 155*a* "1" and the process ID 155*b* "3" in the process assignment information 155, as "12" seconds, by dividing the rail length 153*d* "6.0" m by the movement speed 153*f* "0.5" m/s. As another calculation method, the layout evaluation unit 142 may use a mode value or an average value of the movement distance of the robot.

Then, the layout evaluation unit 142 calculates the cycle time 157*b* as the sum of the main facility work time, the setup facility work time, and the setup facility movement time for the layout candidate n (step S210). The layout evaluation unit 142 calculates the cycle time for each main facility. That is, if the main facility is in charge of a plurality of processes, the layout evaluation unit 142 calculates the total cycle time of the processes performed by the main facility.

For example, in the case of the processing machine C of the example illustrated in FIG. 15, the main facility work time with the process ID "4" and the process ID "5" assigned to the processing machine C is calculated as "150" seconds by adding "75" seconds and "75" seconds, respectively, the setup facility work time is "120" seconds, and the setup facility movement time is "12" seconds. The layout evaluation unit 142 adds up these values to calculate the cycle time of the processing machine C as "282" seconds.

Then, the layout evaluation unit 142 determines whether the cycle time constraint in the constraint condition information 154 is satisfied (step S211). Specifically, the layout evaluation unit 142 determines whether the maximum value of cycle time of the main facility of the layout candidate n satisfies the cycle time constraint.

If the cycle time constraint is not satisfied ("No" in step S211), the layout evaluation unit 142 increments the number of processes n of the layout candidate and returns the control to step S205.

If the cycle time constraint is satisfied ("Yes" in step S211), the layout evaluation unit 142 ends the layout evaluation processing.

The above is an example of the flow of the layout evaluation processing. According to the layout evaluation processing, it is possible to select a layout that minimizes the investment cost while satisfying the constraint condition from among the n layout candidates. In this example, the objective function is set as the investment cost with the cycle time and the floor space as constraints. Alternatively, a layout that minimizes the floor space may be selected by setting the objective function as the floor space with the investment cost and the cycle time as constraints, or a layout that minimizes the cycle time may be selected by setting the objective function as the cycle time with the investment cost and the floor space as constraints, for example.

Figure 13:
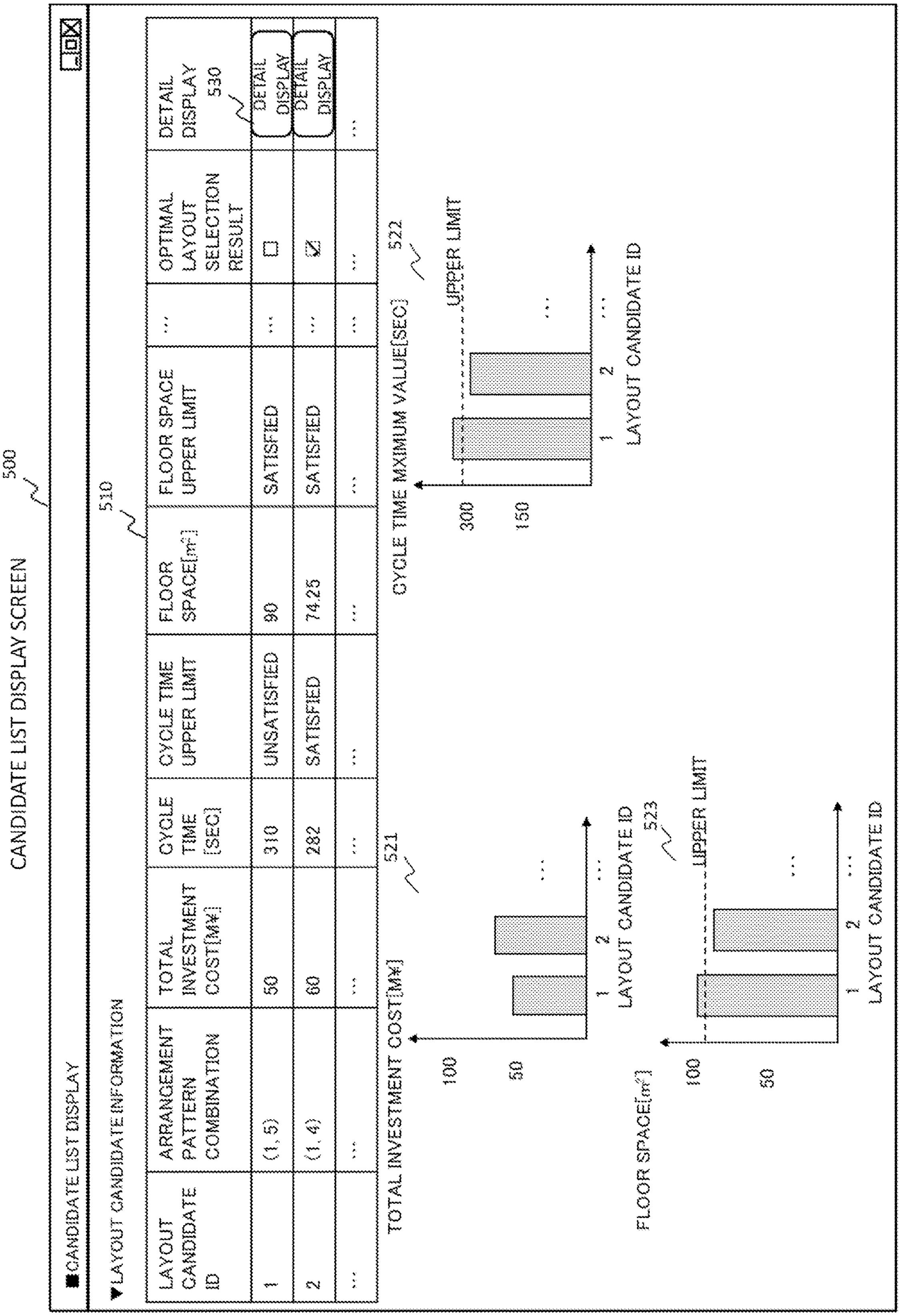
FIG. 13 is a diagram illustrating an example of a candidate list display screen.

FIG. 13 is a diagram illustrating an example of a candidate list display screen. The candidate list display screen 500 is an example of a screen displayed in step S003 of the production line design processing. The candidate list display screen 500 includes a layout candidate information table 510, a total investment cost comparison graph 521, a cycle time comparison graph 522, a floor space comparison graph 523, and a layout detail display button 530 of a layout candidate ID "1".

In the layout candidate information table 510, information regarding layout candidates such as arrangement pattern combination, total investment cost, cycle time, and floor space for each layout candidate ID is displayed in ascending order of the total investment cost.

In addition, in the layout candidate information table 510, determination results as to whether constraint conditions based on evaluation indexes such as cycle time upper limit and floor space upper limit are satisfied, and optimal layout IDs selected from all layout candidate IDs are displayed. Further, in the table 510 of layout candidate information, a layout detail display button 530 for receiving an instruction to display details of each layout candidate is displayed.

In the total investment cost comparison graph 521, the values of the total investment costs in the layout candidate information table 510 are displayed in a comparable manner by layout candidate. In the cycle time comparison graph 522, the values of the cycle times in the layout candidate information table 510 are displayed in a comparable manner by layout candidate, and the cycle time upper limit value of the constraint condition information 154 is displayed as the upper limit value indicated by a horizontal broken line in the graph. In the floor space comparison graph 523, the values of the floor space in the layout candidate information table 510 are displayed in a comparable manner by layout candidate, and the product (that is, the total area) of the floor space vertical width upper limit and the floor space lateral width upper limit in the constraint condition information 154 is displayed as the upper limit value indicated by a horizontal broken line in the graph.

Upon receiving the input, the layout detail display button 530 effects a screen transition to a candidate detail display screen 600 that displays details of the corresponding layout ID. By using the candidate list display screen 500, the user can easily, intuitively, and quantitatively compare the layout evaluation results of arrangement pattern combinations based on the investment cost and the cycle time.

FIG. 14 is a diagram illustrating an example of the candidate detail display screen. The candidate detail display screen 600 is displayed when an input to the layout detail display button 530 in the candidate list display screen 500 is received.

On the candidate detail display screen 600, a layout information table 610 and a layout diagram 620 are displayed for the selected combination of layout candidate ID and arrangement pattern. In the layout information table 610, facility name, central X coordinate, central Y coordinate, rotation amount, outer lateral width, and outer vertical width are displayed in association with each other for each line ID and each station ID. In the layout diagram 620, the physical arrangement of the facilities described in the layout information table 610 is visually displayed. The layout diagram 620 is a two-dimensional or three-dimensional diagram (for example, a plan view, a perspective view, a bird's-eye view, a six-sided view, and the like).

According to the candidate detail display screen 600, the user can visually and quickly understand the facility layout of the selected arrangement pattern combination, and share the screen with a plurality of designers to quickly and easily consider a layout improvement plan.

FIG. 15 is a diagram illustrating an example of a cycle time display screen. A cycle time display screen 700 is displayed when the input to the layout detail display button 530 in the candidate list display screen 500 is received (for example, the candidate detail display screen 600 and the cycle time display screen 700 are displayed at the same time).

On the cycle time display screen 700, a process assignment table 710 and a cycle time detail graph 720 are displayed. In the process assignment table 710, the process content for each product ID and process ID, the assigned main facility, the main facility work time, the assigned setup facility, the setup facility work time, and the setup facility movement time are displayed in association with each other. In the cycle time detail graph 720, the cycle time for each combination of the setup facility and the main facility and the cycle time upper limit as a constraint condition are graphically displayed.

According to the cycle time display screen 700, the user can quantitatively understand the variation in cycle time for each main facility, and further share the screen with a plurality of designers to consider an increase or decrease in the number of main facilities and a change in process assignment.

The production line design apparatus and the production line design system to which the first embodiment according to the present invention is applied have been described above. According to the first embodiment of the present invention, it is possible to generate a plurality of layout candidates including not only the floor surface-fixed facilities but also movable facilities that perform floor surface traveling or ceiling traveling, and derive an optimal layout from a wide range of layout candidates. In addition, since using the arrangement pattern reduces the number of combinations of layout candidates to be searched for, it is possible to derive an optimal layout in a short time from the above-described wide range of layout candidates, and improve the efficiency of the layout design work of the production line. Therefore, according to the present invention, it is possible to provide a technique for improving productivity of design of a production line.

The present invention is not limited to the above-described embodiments, and includes various modifications. For example, each of the above-described embodiments has been described in detail in order to make the present invention easy to understand, and the present invention is not necessarily limited to embodiments including all the components described above. Some of the components of one embodiment can be replaced with components of another embodiment, and the components of an embodiment can be added to the components of another embodiment. It is possible to add, delete, and replace some of components to, from, and with others of the components in each embodiment.

Some or all of the above-described components, functions, processing units, processing means, and the like may be implemented by hardware designed with an integrated circuit, for example. The above-described components, functions, and the like may be implemented by software by a processor interpreting and executing programs for performing the functions. Information such as programs, tables, and files for implementing the functions can be stored in a recording device such as a memory, a hard disk, and an SSD, or a recording medium such as an IC card, an SD card, and a DVD.

The control lines and the information lines indicate what is considered to be necessary for the description, and do not necessarily indicate all the control lines and the information lines on the product. In practice, it may be considered that almost all the components are connected to each other.

What is claimed is:

1. A production line design apparatus comprising:

a non-transitory storage medium that stores facility configuration information that defines a number configuration including at least one or more main facilities that perform a main work in a production line and at least one or more setup facilities that perform an auxiliary work of the main facility, and arrangement pattern definition information including a plurality of arrangement patterns that define a combination of a movement method of the setup facility that is adoptable and a relative positional relationship between the main facility that is adoptable and the setup facility; and a processor configured by one or more executable computer programs to perform operations comprising:

layout candidate generation processing of generating, by the processor, layout information that satisfies the number configuration by combining the plurality of arrangement patterns using the facility configuration information and the arrangement pattern definition information, and presenting, by the processor, on a display in communication with the processor, at least one two-dimensional or three-dimensional layout diagram showing a physical arrangement of facilities corresponding to the layout information.

2. The production line design apparatus according to claim 1, wherein the non-transitory storage unit medium stores facility candidate information defining a specification of a peripheral facility required according to the movement method of the setup facility, and the operations further comprise:

arranging, by the processor, the peripheral facility by using the facility candidate information according to a position of the setup facility in the arrangement pattern, and including, by the processor, the peripheral facility in the layout information.

3. The production line design apparatus according to claim 1, wherein the arrangement pattern is associated with the arrangement pattern definition information in accordance with a ratio between a number of the main facilities and a number of the setup facilities, and the operations further comprise specifying, by the processor, the arrangement pattern using the ratio in the layout candidate generation processing.

4. The production line design apparatus according to claim 1, wherein constraint condition information for specifying a constraint condition including an upper limit of a cycle time of the main facility is stored in the non-transitory storage medium, and process assignment information including the main facility, a process performed by the main facility, the setup facility used in the process, and a work time of the process is stored in the non-transitory storage medium, and the operations further comprise:

determining, by the processor, for each main facility, the cycle time including the work time of the main facility, the work time of the setup facility, and a movement time of the setup facility, by using the layout information and the process assignment information, and executing, by the processor, layout evaluation processing of evaluating that the layout information satisfying the constraint condition is applicable to a production line.

5. The production line design apparatus according to claim 4, the operations further comprising:

presenting, by the processor, on the display, result information of the layout evaluation processing including evaluation as to whether the layout information is applicable to the production line.

6. The production line design apparatus according to claim 4, the operations further comprising:

presenting, by the processor, on the display, the process assignment information and the cycle time calculated for each piece of the layout information.

7. The production line design apparatus according to claim 4, wherein, in the layout evaluation processing, if the process assignment information includes a plurality of processes to be performed by the main facility, the operations further comprise determining, by the processor, the cycle time by summing work times of the processes for each of the main facilities.

8. The production line design apparatus according to claim 4, wherein, in the layout evaluation processing, if the process assignment information includes a plurality of processes to be performed by the setup facility, the operations further comprise determining, by the processor, the work time of the setup facility by summing work times of the processes for each of the setup facilities.

9. The production line design apparatus according to claim 4, wherein the non-transitory storage medium stores facility candidate information including a movement speed of the setup facility, and in the layout evaluation processing, the operations further comprise determining, by the processor, a quotient of a movement distance of the setup facility according to the process assignment information and the movement speed of the setup facility included in the facility candidate information as the movement time of the setup facility.

10. The production line design apparatus according to claim 1, wherein the non-transitory storage medium stores constraint condition information for specifying a constraint condition including an outer dimension in the layout information, the facility configuration information includes information for specifying outer dimensions of the main facility and the setup facility, and the operations further comprise:

determining, by the processor, an outer dimension in each piece of layout information based on an outer dimension of the main facility and an outer dimension of the setup facility by using the layout information and the facility configuration information, and executing, by the processor, layout evaluation processing of evaluating that the layout information satisfying the constraint condition is applicable to a production line.

11. A production line design system that designs a production line using an information processing apparatus, the information processing apparatus including:

a non-transitory storage medium that stores facility configuration information that defines a number configuration including at least one or more main facilities that perform a main work in a production line and at least one or more setup facilities that perform an auxiliary work of the main facility, and arrangement pattern definition information including a plurality of arrangement patterns that define a combination of a movement method of the setup facility that is adoptable and a relative positional relationship between the main facility that is adoptable and the setup facility; and a processor configured by one or more executable computer programs to perform operations comprising:

executing, by the processor, layout candidate generation processing of generating layout information that satisfies the number configuration by combining the plurality of arrangement patterns using the facility configuration information and the arrangement pattern definition information, and presenting, by the processor, on a display in communication with the processor, at least one layout diagram showing at least a physical arrangement of machines corresponding to the layout information.

12. A production line design method for designing a production line using an information processing apparatus, the method comprising:

storing, in a non-transitory storage medium of the information processing apparatus:

facility configuration information that defines a number configuration including at least one or more main facilities that perform a main work in a production line and at least one or more setup facilities that perform an auxiliary work of the main facility, and arrangement pattern definition information including a plurality of arrangement patterns that define a combination of a movement method of the setup facility that is adoptable and a relative positional relationship between the main facility that is adoptable and the setup facility; and executing, by a processor of the information processing apparatus, layout candidate generation processing of generating layout information that satisfies the number configuration by combining the plurality of arrangement patterns using the facility configuration information and the arrangement pattern definition information, and presenting, by the processor of the information processing apparatus, on a display in communication with the processor, at least one two-dimensional or three-dimensional layout diagram showing a physical arrangement of facilities corresponding to the layout information.

* * * * *